(12) United States Patent
Han et al.

(10) Patent No.: US 7,462,212 B2
(45) Date of Patent: Dec. 9, 2008

(54) CYCLONE DUST SEPARATING APPARATUS FOR VACUUM CLEANER AND VACUUM CLEANER HAVING THE SAME

(75) Inventors: Jung-gyun Han, Busan (KR);
 Jang-keun Oh, Gwangju (KR); Min-ha Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 593 days.

(21) Appl. No.: 11/318,177

(22) Filed: Dec. 23, 2005

(65) Prior Publication Data

US 2006/0230724 A1 Oct. 19, 2006

Related U.S. Application Data

(60) Provisional application No. 60/665,941, filed on Mar. 29, 2005.

(30) Foreign Application Priority Data

May 10, 2005 (KR) .................. 10-2005-0038738

(51) Int. Cl.
*B01D 45/12* (2006.01)
(52) U.S. Cl. ................ 55/343; 55/346; 55/349; 55/429; 55/459.1; 55/DIG. 3
(58) Field of Classification Search ............ 55/343, 55/346, 349, 429, 459.1, DIG. 3
See application file for complete search history.

(56) References Cited

U.S. PATENT DOCUMENTS

| | | | |
|---|---|---|---|
| 3,425,192 A | 2/1969 | Davis | |
| 4,373,228 A | 2/1983 | Dyson | |
| 5,129,124 A | 7/1992 | Gamou et al. | 15/352 |
| 6,238,451 B1 | 5/2001 | Conrad et al. | |
| 2003/0057151 A1 | 3/2003 | Kopec et al. | |
| 2004/0068827 A1 | 4/2004 | Dyson | |

FOREIGN PATENT DOCUMENTS

| | | |
|---|---|---|
| CN | 1593323 | 3/2005 |
| EP | 0728435 | 8/1996 |
| EP | 1563909 | 8/2005 |

(Continued)

OTHER PUBLICATIONS

DC14 Dyson Brochure, Feb. 2005.

(Continued)

*Primary Examiner*—Robert A Hopkins
(74) *Attorney, Agent, or Firm*—Staas & Halsey LLP (57) ABSTRACT

A cyclone dust separating apparatus has a first cyclone chamber for separating particles from the externally-drawn fluid by centrifugal force, one or more second cyclone chambers for separating particles from the fluid discharged from the first cyclone chamber by centrifugal force, and one or more third cyclone chambers for separating particles from the fluid discharged from the second cyclone chambers, and causing the fluid to be discharged out via a discharge passage. The second and the third cyclone chambers are arranged in radial relation with respect to the first cyclone chamber, and thus, surround the first cyclone chamber. Therefore, the cyclone dust separating apparatus provides multi-stage centrifugal cleaning process and improved cleaning efficiency, while remaining compact-sized.

45 Claims, 5 Drawing Sheets

FOREIGN PATENT DOCUMENTS

| | | |
|---|---|---|
| GB | 555558 | 7/1941 |
| GB | 2101504 | 1/1983 |
| GB | 2113575 | 8/1983 |
| GB | 2367019 | 3/2002 |
| GB | 2372468 | 8/2002 |
| GB | 2406064 | 3/2005 |
| GB | 2410911 | 8/2005 |
| GB | 2410913 | 8/2005 |
| JP | 52014775 | 2/1977 |
| JP | 2002-326041 | 11/2002 |
| KR | 10-2002-0071622 | 9/2002 |
| KR | 10-2002-0071624 | 9/2002 |
| KR | 1020020078798 | 10/2002 |
| KR | 10-2004-0100720 | 12/2004 |
| WO | WO03/030702 | 4/2003 |

OTHER PUBLICATIONS

U.S. Appl. No. 11/242,382, filed Oct. 3, 2005, Jung-gyun Han et al., Samsung Gwangju Electronics Co., Ltd.

British Combined Search and Examination Report dated May 25, 2006 issued in respect to British Application No. 0602219.8 filed on Feb. 8, 2006.

Dyson DC07 Owner's Manual Illustration, date unknown.

Dyson DC08 Owner's Manual Illustration, date unknown.

UK High Court of Justice, Chancery Division, Patents Court (HC07C02383) "Amended Particulars of Claim", May 6, 2008.

UK High Court of Justice, Chancery Division, Patents Court (HC07C02383) "Re-amended Grounds of Invalidity", Jan. 23, 2008.

UK High Court of Justice, Chancery Division, Patents Court (HC07C02383) "Re-amended Defence", re-re-served Jun. 6, 2008.

UK High Court of Justice, Chancery Division, Patents Court (HC07C02383) "Request for Further Information of the Amended Grounds of Invalidity", served Jan. 30, 2008.

UK High Court of Justice, Chancery Division, Patents Court (HC07C02383) "Claimant's Response to Defendant's Request for Further Information", Feb. 13, 2008.

UK High Court of Justice, Chancery Division, Patents Court (HC07C02383) "Witness Statement of Min Ha Kim", Mar. 13, 2008.

UK Patent GB 2424603B, Feb. 21, 2007.

UK Patent GB 2424606A, Oct. 4, 2006.

UK Patent GB 2424606B, Mar. 14, 2007.

Claim Form dated Sep. 10, 2007 corresponding to United Kingdom Patent Application No. GB2424606.

CYCLONE DUST SEPARATING APPARATUS FOR VACUUM CLEANER AND VACUUM CLEANER HAVING THE SAME

CROSS-REFERENCE TO RELATED APPLICATIONS

This application claims the benefit of U.S. provisional application No. 60/665,941, filed Mar. 29, 2005, in the United States Patent and Trademark Office, and claims the benefit of Korean Patent Application No. 2005-38738, filed May 10, 2005, in the Korean Intellectual Property Office, the disclosures of both of which are incorporated herein by reference.

BACKGROUND OF THE INVENTION

1. Field of the Invention

The present invention relates to a vacuum cleaner. More particularly, the present invention relates to a cyclone dust separating apparatus for separating contaminants from drawn air, and a vacuum cleaner having the same.

2. Description of the Related Art

Generally, a cyclone dust separating apparatus spins externally-drawn air or fluid therein and, thus, separates contaminants from the drawn-in fluid by using the centrifugal force generated from the spinning fluid. In other words, the cyclone dust separating apparatus is a centrifuge device, which uses centrifugal force to separate contaminants from the drawn-in fluid.

The cyclone dust separating apparatus includes a cyclone chamber in which the drawn-in fluid is rotated. The cyclone chamber is sized to correspond to the contaminants to be removed from the fluid, and generally one cyclone dust separating apparatus has a single cyclone chamber. Accordingly, in the conventional cases, a cyclone dust separating devices can only separate the contaminants that are large enough to be handled by the structure of the cyclone chamber.

Such a limited cleaning operation of the cyclone dust separating apparatus is disadvantageous especially for the cyclone dust separating apparatuses for vacuum cleaners, that are required to separate almost every contaminants regardless of particle sizes. The conventional cyclone dust separating apparatus is particularly poor at cleaning fine contaminants, and in order to solve this problem, studies have recently carried out to develop a cyclone dust separating apparatus that has a plurality of cyclone chambers and separate contaminants in multiple stages. The problem of this approach is that, as the number of cyclone chambers increases to satisfy the desired contaminant separation efficiency, the overall size of the cyclone dust separating apparatus is enlarged and structure is complicated, which is obviously not beneficial to use in the vacuum cleaner.

SUMMARY OF THE INVENTION

Accordingly, the present general inventive concept has been made to solve the above-mentioned and/or problems, and an aspect of the present general inventive concept is to provide a cyclone dust separating apparatus that is compact-sized and yet provides improved contaminant separation efficiency and a vacuum cleaner having such a cyclone dust separating apparatus.

To achieve the above inventive concept of the present invention, a cyclone dust separating apparatus for separating particles from an externally-drawn fluid, includes a first cyclone chamber for separating particles from the externally-drawn fluid by centrifugal force; one or more second cyclone chambers for separating particles by centrifugal force from the fluid discharged from the first cyclone chamber; and one or more third cyclone chambers for separating particles by centrifugal force from the fluid discharged from the second cyclone chambers, and causing the fluid to be discharged out via a discharge passage. The second and the third cyclone chambers may be arranged along the outer boundary of the first cyclone chamber.

Accordingly, the multi-stage cyclone dust separating apparatus can improve cleaning efficiency while remaining compact-sized.

The second cyclone chambers may have inner diameter smaller than that of the first cyclone chamber and larger than that of the third cyclone chambers.

A plurality of the third cyclone chambers may be provided such that two or more third cyclone chambers are communicated with one of outlets of the second cyclone chambers, respectively. The third cyclone chambers may be formed along the outer boundary of the first cyclone chamber, and arranged between the second cyclone chambers such that the second and the third cyclone chambers are arranged in a circle with respect to the first cyclone chamber.

At least a pair of third cyclone chambers may be communicated with one of outlets of the second cyclone chambers, and the at least a pair of third cyclone chambers may be in mirror-symmetrical relation with respect to the outlet of the second cyclone chamber.

The first to third cyclone chambers may be formed independently from each other. As the air flowing into the respective cyclone chambers is provided with spaces for whirling current, the contaminant separation efficiency can be far more improved in comparison with the structure where the cyclone chambers are superimposed.

The cyclone dust separating apparatus includes a cyclone body comprising an inlet through which the externally-drawn fluid is guided to the first cyclone chamber, and the first to third cyclone chambers formed therein; a first cover comprising the discharge passage, and covering an upper end of the cyclone body which is open; and a second cover located between the first cover and the cyclone body. A first, a second and a third passages may be formed according to the connecting of the second cover and the cyclone body, the first passage connecting an outlet of the first cyclone chamber with inlets of the second cyclone chambers, the second passage connecting outlets of the second cyclone chambers with inlets of the third cyclone chambers, and the third passage guiding the fluid exiting from the third cyclone chambers towards the discharge passage.

The second cover may include a first curvature part and a second curvature part formed by curving a part of the second cover, forming the first passage when the cyclone body is connected with the second cover; and a hollow connecting pipe extended toward the upper side of the second cover, connecting the outlets of the second cyclone chambers with the third chamber. The first through third passages can be formed at one time by connecting the second cover with the cyclone body. Even when a plurality of cyclone chambers is formed, it is possible to prevent the complexity of the structure for the air flow.

The cyclone dust separating apparatus may include a contaminant receptacle removably mounted to a lower end of the cyclone body which is open, to collect the particles separated in the first to third cyclone chambers, the contaminant receptacle comprising a first collecting space, a second collecting space, and a partition located in the contaminant receptacle, separating the first space from the second space. According to the connection of the cyclone body with the contaminant receptacle, the first collecting space may be communicated with the first cyclone chamber, and the second collecting space is communicated with the second and the third cyclone chambers, respectively.

A vacuum cleaner includes an air suction port through which a contaminant-laden air is drawn from a surface being cleaned; a suction motor for generating a suction force at the air suction port; and a cyclone dust separating apparatus for separating contaminants from the drawn contaminant-laden air, the cyclone dust separating apparatus comprising a first cyclone chamber for separating the contaminants from the air by centrifugal force, one or more second cyclone chambers for separating the contaminants from the air discharged from the first cyclone chamber by centrifugal force; and one or more third cyclone chambers for separating the contaminants from the air discharged from the second cyclone chambers by centrifugal force. The second cyclone chambers may have inner diameter smaller than that of the first cyclone chamber larger than that of the third cyclone chambers.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE EXEMPLARY EMBODIMENTS

Certain embodiments of the present invention will be described in greater detail with reference to the accompanying drawings.

In the following description, same drawing reference numerals are used for the same elements even in different drawings. The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
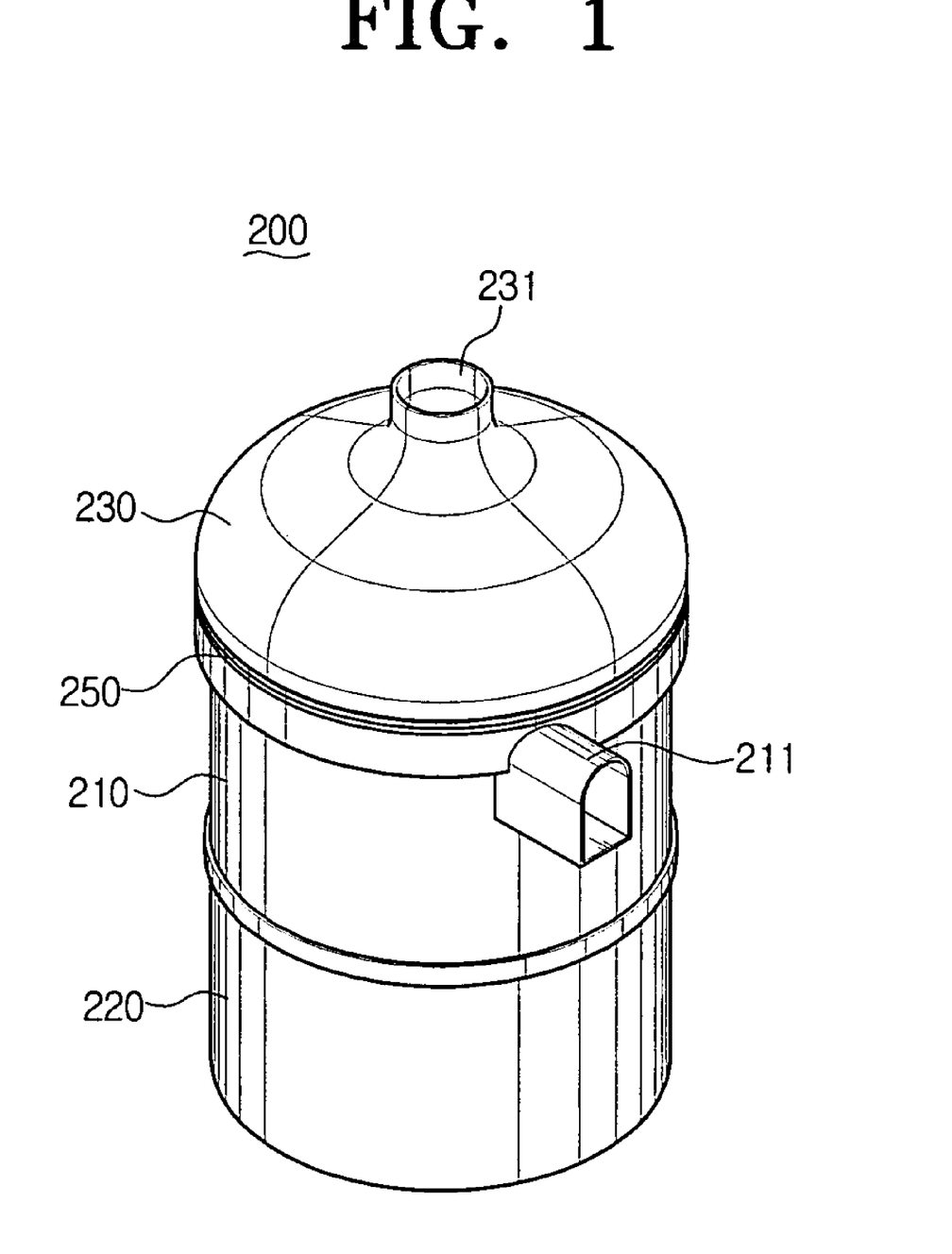
FIG. 1 is a perspective view of a cyclone dust separating apparatus according to a first embodiment of the present invention.
Figure 2:
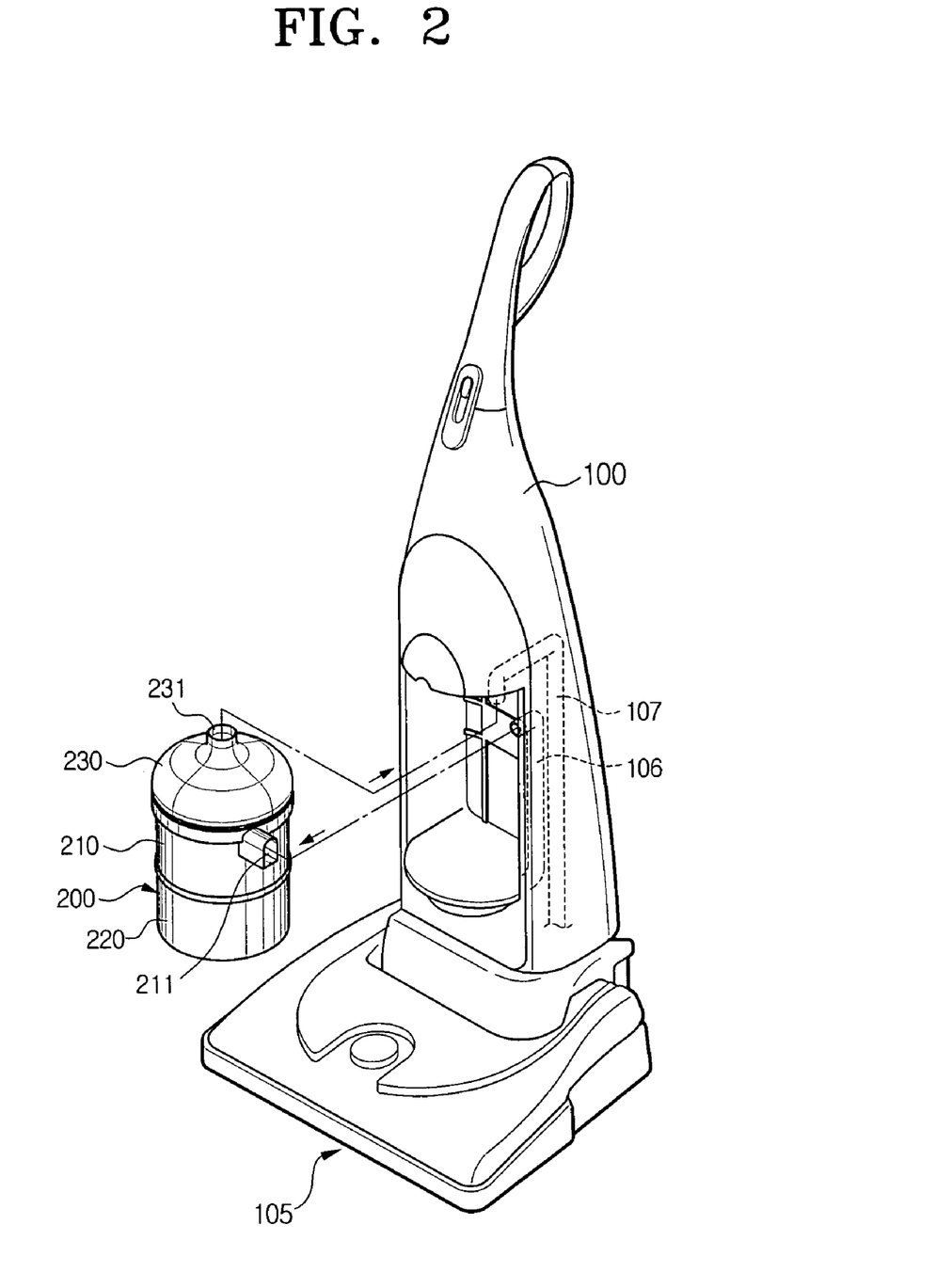
FIG. 2 is a view illustrating a cyclone dust separating apparatus being employed in a vacuum cleaner according to the first embodiment of the present invention.

Referring to FIGS. 1 and 2, a cyclone dust separating apparatus 200 according to an exemplary embodiment of the present invention is mounted in a vacuum cleaner 100. Cyclone dust separating apparatus 200 includes an inlet 211 and an outlet 231, which are connected to an air suction pie 106 and an air discharge pipe 107 of the vacuum cleaner 100, respectively. Upon driving of a suction motor (not shown) in the vacuum cleaner 100, external air laden with contaminants is drawn through a contaminant suction port (not shown) of a suction port assembly 105 of the vacuum cleaner 100, and sequentially passes an air suction pipe 106 of the vacuum cleaner 100 into the inlet 211 such that the cyclone dust separating apparatus 200 separates the contaminants from the drawn air with centrifuge operation, and discharges the cleaned air through the outlet 231 into the air discharge pipe 107 of the vacuum cleaner 100, and outside of the vacuum cleaner 100.

Figure 3:
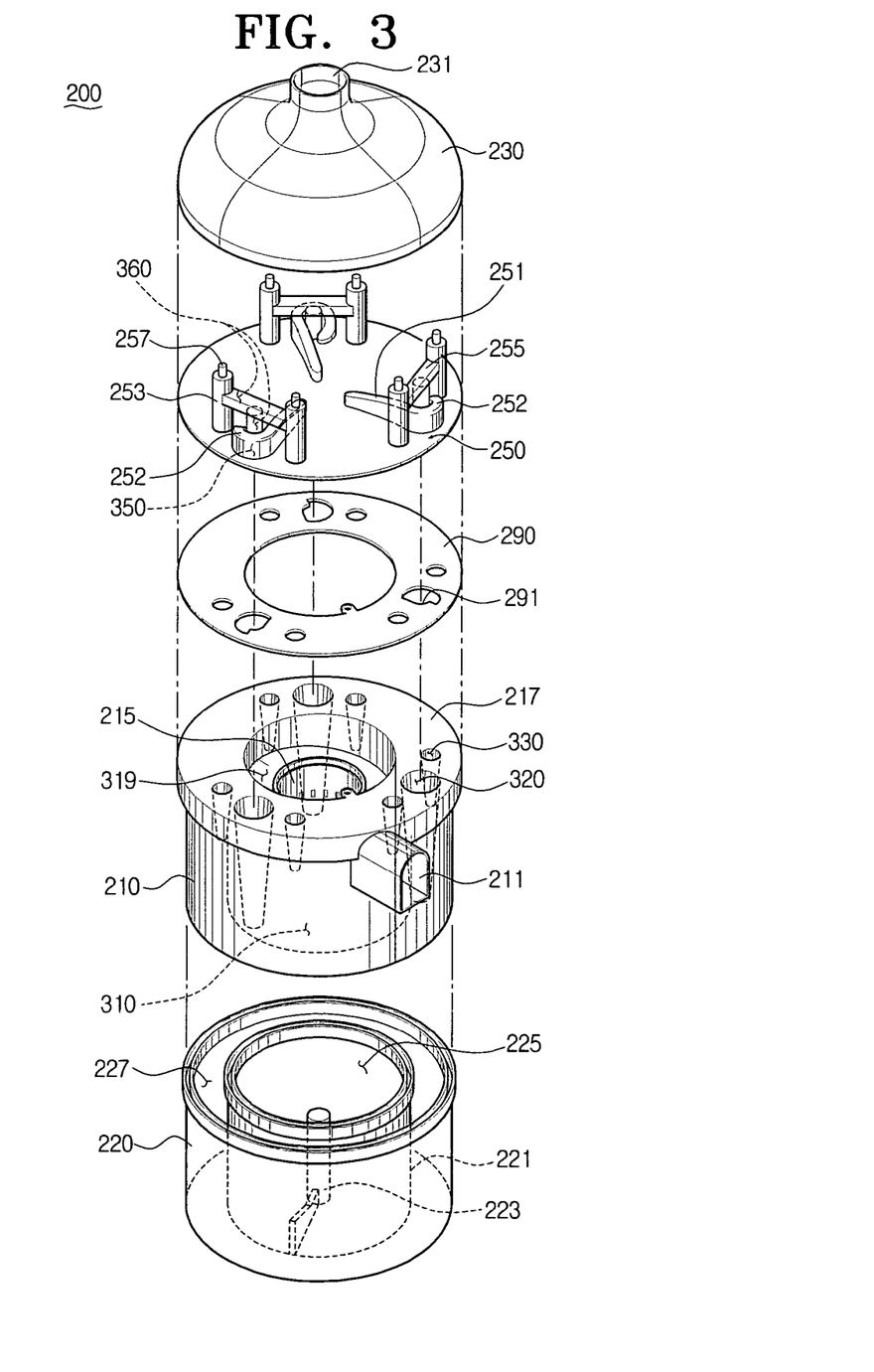
FIG. 3 is a exploded perspective view of a cyclone dust separating apparatus according to the first embodiment of the present invention.
Figure 4:
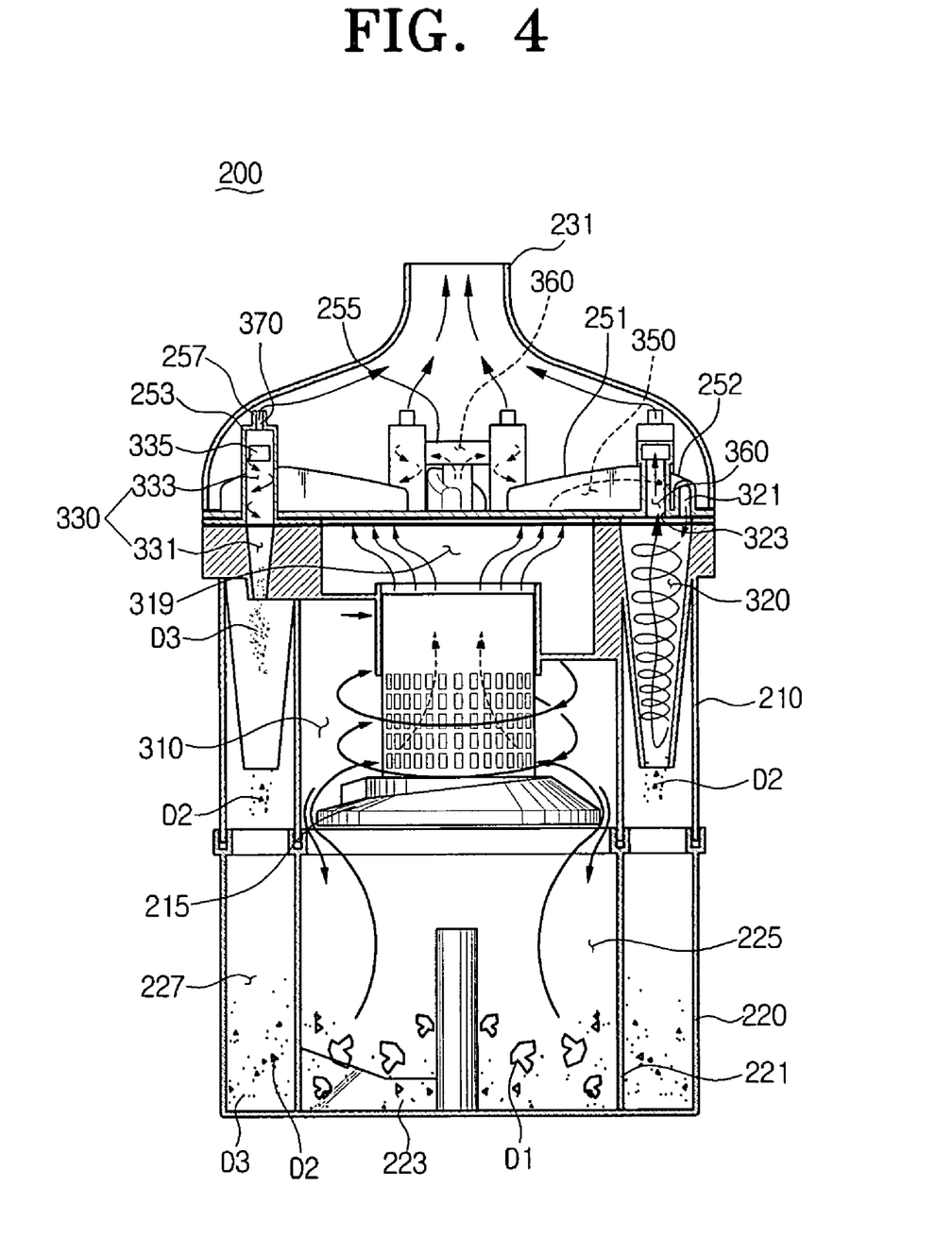
FIG. 4 is a sectional view illustrating the cyclone dust separating apparatus of FIG. 3 in operation.

FIGS. 3 and 4 illustrate the cyclone dust separating apparatus 200 according to the above embodiment of the present invention. Referring to FIGS. 3 and 4, the cyclone dust separating apparatus 200 includes a first cyclone chamber 310, at least one second cyclone chamber 320, and at least one third cyclone chamber 330. Accordingly, the contaminants are separated from the drawn air by three stages, and therefore, improved contaminant separation efficiency can be provided.

The cyclone dust separating apparatus 200 according to this particular embodiment of the present invention includes first cyclone chambers 310, and a plurality of second and third cyclone chambers 320 and 330.

With the operation of the suction motor (not shown), the first cyclone chamber 310 firstly separates contaminants as the air is drawn from the surface being cleaned through the contaminant suction port (not shown). Referring to FIGS. 3 and 4, the first cyclone chamber 310 according to this embodiment is pierced through the center part of the cyclone body 210. Cyclone body 210 has both its upper and lower ends open. The entry (not shown) of the first cyclone chamber 310 is connected with the inlet 211 which passes through the outer wall of the cyclone body 210. The inlet 211 is connected with the air suction pipe 106 (FIG. 2) such that the inlet 211 guides the air into the first cyclone chamber 310 when the air is drawn through the contaminant suction port according to the operation of the suction motor. The lower end of the first cyclone chamber 310 is connected with a first collecting space 225 of a contaminant receptacle 220. The contaminant receptacle 220 is removably connected to the lower end of the cyclone body 210. Accordingly, as the contaminants D1 are separated in the first cyclone chamber 310, the contaminants fall to the first collecting space 225 of the contaminant receptacle 220 by self-weight. When the contaminants D1 are separated from the air, the air of the first cyclone chamber 310 is discharged through the outlet 319 of the first cyclone chamber 310 by the operation of the suction motor. In this particular embodiment, a grill assembly 215 can additionally be mounted at the outlet 319 of the first cyclone chamber 310. As the cleaned air from the first cyclone chamber 310 is once again cleaned through the grill assembly 215, further improved contaminant separation efficiency can be provided by the cyclone dust separating apparatus 200.

The contaminant receptacle 220 according to the above embodiment has partitions 221 provided therein, to divide interior of the contaminant receptacle 220 into a space for receiving contaminants D1 separated in the first cyclone chamber 310 (i.e., first collecting space 225), and a space for receiving contaminants D2 and D3 separated in the second and third cyclone chambers 320 and 330. More specifically, the partition 221 is formed in the contaminant receptacle 220 to divide the interior of the contaminant receptacle 220 into a first collecting space 225 for receiving the contaminants D1 separated in the first cyclone chamber 310, and a second collecting space 227 for receiving the contaminants D2 and D3 separated in the second and the third cyclone chambers 320 and 330. Thus, dispersion of minute contaminants D2 and D3 due to movement of large contaminants D1, can be prevented. In addition, a backflow preventive member 223 can protrude from the bottom of the first collecting space 225 to control movement of the contaminants D1 and, thus, prevent the contaminants D1 from re-dispersing from the first collecting space 225 once it is piled.

The second cyclone chambers 320 secondly filter the air, after the air has been cleaned by and flowed from the first cyclone chamber 310. The second cyclone chambers 320 are formed along the edgewise part 217 of the cyclone body 210, in a penetrating manner. The second cyclone chambers 320 have open upper and lower ends. The second cyclone chambers 320 each form a frusto-conical shape that has progressively narrowing diameter toward the lower end. The second cyclone chambers 320 are separately formed from the first cyclone chamber 310, and dispersed around the outer boundary of the first cyclone chamber 310. The contaminants D2 separated in the second cyclone chambers 320 are collected in the second collecting space 227 of the contaminant receptacle 220. Although the cyclone dust separating apparatus 200 has three second cyclone chambers 320 in this particular embodiment of the present invention, this is only for exemplary purpose, and therefore, there is no limit to the number of second cyclone chambers 320, except that the chambers 320 should not overlap or interfere with the path of the inlet 211 to the first cyclone chamber 310. However, the second cyclone chambers 320 should be arranged at predetermined intervals, in consideration of the other cyclone chambers such as a third cyclone chamber 330 for example, which will be explained below.

The cyclone dust separating apparatus 200 according to this particular embodiment of the present invention includes a first passage 350 which connects the outlet 319 of the first cyclone chamber 310 respectively to entrances of the second cyclone chambers 320. The first passage 350 is defined by a second cover 250 that is located between the cyclone body 210 and a first cover 230. The second cover 250 includes a first curvature part 251 that is defined by a part of the second cover 250 curved upwardly. The first passage 350 is defined as an inner space at the lower part of the first curvature part 251 between the coupling of the second cover 250 and the cyclone body 210. Therefore, the first passage 350 is defined by using the second cover 250 that is located at the upper end of the cyclone body 210, and therefore the structure of the cyclone dust separating apparatus 200 can be simplified.

Meanwhile, the third cyclone chambers 330 are provided to filter the air flowing in from the second cyclone chambers 320 so as to separate even the final particles of contaminants D3 from the air. For a higher separation efficiency, the third cyclone chambers 330 may be formed to have smaller size than the first and second cyclone chambers 320 and 330. In this particular embodiment, the second cyclone chambers 320 are smaller than the first cyclone chamber 310, and larger than the third cyclone chambers 330. The third cyclone chambers 330 in this embodiment are formed to have a frusto-conical shape that has progressively narrowing diameter toward the lower end.

The third cyclone chambers 330 are defined as a plurality of first chambers 331 penetrating through the cyclone body 210. The third cyclone chambers 330 are in fluid communication with a plurality of second chambers 333 formed at the lower part of a plurality of second curvature parts 252 of the second cover 250, according to the joining of the second cover 250 and the cyclone body 210. The second curvature parts 252 are formed as the part of the second cover 250 is curved upwardly. The third cyclone chambers 330 in this embodiment are formed to align relative to the second cyclone chambers 320. FIGS. 3 and 4 show one example in which a plurality of second cyclone chambers 320 (three second cyclone chambers in this embodiment) are communicated with one first cyclone chamber 310, and a plurality of third cyclone chambers 330 (two third cyclone chambers 330 in this embodiment) are communicated with the second cyclone chambers 320, respectively. However, one will understand that the arrangement of the second and third cyclone chambers 320 and 330 may adequately vary according to needs. In this particular embodiment, each pair of third cyclone chambers 330 is communicated with one second cyclone chamber 320, and formed in mirror-symmetrical relation with respect to the second cyclone chamber 320. Accordingly, a plurality of third cyclone chambers 330 (two, in this embodiment) are arranged between each second cyclone chamber 320, and the circumference of the first cyclone chamber 310 is surrounded by the second and third cyclone chambers 320 and 330. As a result, at least three air separation stages can be provided, while the size of the cyclone dust separating apparatus 200 is prevented from increasing. The dust separating apparatus 200 according to a certain aspect of the present invention includes a second passage 360 to connect inlets 335 of the third cyclone chambers 330 with outlets 323 of the second cyclone chambers 320, and a third passage 370 to guide air exiting from the third cyclone chambers 330. The second passage 360 in this particular embodiment is formed in a T-shaped hollow connecting pipe 255 that protrudes from the upper side of the second cover 250. An air outlet 257 is formed penetrating the upper end of the second curvature part 252, and the third passage 370 is formed in the air outlet 257. The cleaned air exits from the third passage 370, and then gets out of the cyclone dust separating apparatus 200 via the outlet 231 penetrating the upper end of the first cover 230. According to the structure of the first to third passages 350, 360, 370 as described above, the first to third passages 350, 360, 370 can be provided to connect the first to third cyclone chambers 310, 320, 330 simply by connecting the first to third cyclone chambers 310, 320, 330. Therefore, the structure of the cyclone dust separating apparatus 200 can be simplified.

The operation of the cyclone dust separating apparatus constructed as explained above according to one exemplary embodiment of the present invention will be described below with reference to the accompanying drawings.

First, contaminant-laden air is drawn from the surface being cleaned (not shown) through a contaminant suction port (not shown). When the air is drawn to the first cyclone chamber 310 via the inlet 211, the air is caused to whirl. By the whirling current, relatively heavy particles of contaminants D1 are separated in the first cyclone chamber 310, and fall to the first collecting space 225 of the contaminant receptacle 220 by self-weight.

After the first separation of contaminants D1, the air is secondly filtered while it passes through the grill assembly 215, and branched towards the entries 321 of the second cyclone chambers 320 via the first passage 350. As the air enters the second cyclone chambers 320, the air circulates due to a guide member 291 that is formed on a gasket 290 between the second cover 250 and the cyclone body 210. By the vortex of the spinning air, contaminants D2 are once again separated from the air and drop to the second collecting space 227 of the contaminant receptacle 220 by self-weight.

After the contaminants D2 are separated, the air exits from the second cyclone chambers 320 and branched towards the third cyclone chambers 330, respectively. In this embodiment, the second passage 360 is formed such that the air exiting from the unit number of second cyclone chambers 320 is branched towards the pair of third cyclone chambers 330. The air again circulates in the third cyclone chambers 330, thus forcing out relatively light contaminants D3. The separated contaminants D3 are piled in the second collecting space 227 of the contaminant receptacle 220, and the air, which has undergone three stages of cleaning process through the first to third cyclone chambers 310, 320, 330 and the grill assembly 215, is passed through the third passages 370 penetrating the upper ends of the third cyclone chambers 330, and discharged out of the cyclone dust separating apparatus 200 through the outlet 231.

Figure 5:
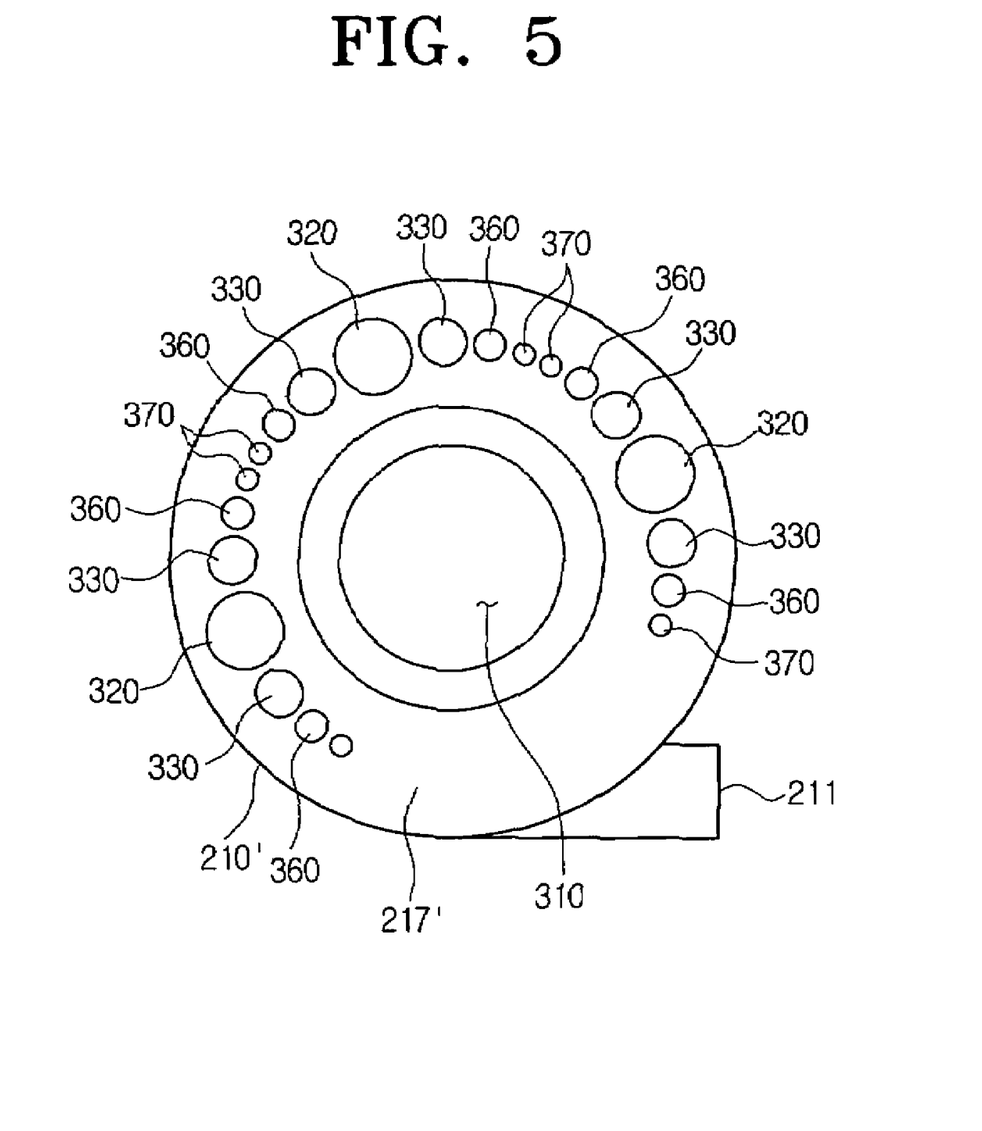
FIG. 5 is a plan view illustrating the upper body part of a cyclone dust separating apparatus according to a second embodiment of the present invention.

While a cyclone dust separating apparatus providing three stages of centrifugal cleaning process has been described above to exemplify the present invention, one will understand that this should not be construed as limiting. With the concept and idea of the present invention, a cyclone dust separating apparatus may provide a greater number of lower-stage cyclone chambers downstream the first to third cyclone chambers. FIG. 5 shows an example of a cyclone body 210' according to a second embodiment of the present invention, which additionally includes fourth and fifth cyclone chambers 360 and 370. Referring to FIG. 5, the first cyclone chamber 310 of the cyclone dust separating apparatus according to the second embodiment of the present invention is formed at the center of the cyclone body 210', and the second and third cyclone chambers 320 and 330 are arranged at the same positions as explained with reference to the first embodiment. The fourth and fifth cyclone chambers 360 and 370 are arranged between the second and third cyclone chambers 320 and 330, and have an inner diameter smaller than the third cyclone chamber 330. With the fourth and fifth cyclone chambers 340 and 350, cleaning efficiency of particularly light and fine contaminants can be increased. Additionally, with the arrangement of the cyclone chambers, the second to fifth cyclone chambers 320, 330, 360, 370 are arranged in an annular pattern along the outer boundary of the first cyclone chamber 310. Therefore, the cyclone dust separating apparatus of this embodiment can have a larger number of cyclone chambers and thus improved cleaning efficiency, while maintaining the size same as those of the previous embodiments.

In the exemplary embodiments explained above, because contaminants can be separated by at least three stages, the cyclone dust separating apparatus can have increased cleaning efficiency. Additionally, the second cyclone chambers surround the first cyclone chamber along the outer boundary, and the third cyclone chambers are arranged between the second cyclone chambers, again surrounding the first cyclone chamber. As a result, the cyclone dust separating apparatus can have a plurality of cyclone chambers, and at the same time, can remain in compact size.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A cyclone dust separating apparatus for separating particles from drawn-in air, the apparatus comprising:
    a first cyclone chamber separating first dust particles from the air by centrifugal force;
    at least one second cyclone chamber separating second dust particles from air discharged from the first cyclone chamber by centrifugal force; and
    a plurality of third cyclone chambers separating third dust particles from air discharged from the at least one second cyclone chamber, and discharging air from a discharge passage,
    wherein the third cyclone chambers are arranged along an outer periphery of the first cyclone chamber.

2. The apparatus of claim 1, wherein the at least one second cyclone chamber is arranged along the outer periphery of the first cyclone chamber.

3. The apparatus of claim 1, wherein the at least one second cyclone chamber has an inner diameter smaller than an inner diameter of the first cyclone chamber, and larger than an inner diameter of the third cyclone chambers.

4. The apparatus of claim 3, wherein there are a plurality of second cyclone chambers, and wherein plural respective third cyclone chambers respectively solely communicate with an outlet of the at least one second cyclone chamber.

5. The apparatus of claim 4, wherein the at least one second cyclone chamber is arranged circumferentially between a respective pair of third cyclone chambers such that the at least one second cyclone chamber and the pair of third cyclone chambers are arranged circumferentially relative to the first cyclone chamber.

6. The apparatus of claim 5, wherein the pair of third cyclone chambers are positioned in mirror-symmetrical relation with respect to a respective outlet of the at least one second cyclone chamber.

7. The apparatus of claims 1, wherein the first, the at least one second, and the plural third cyclone chambers are arranged independently from each other.

8. The apparatus of claim 1, further comprising:
    a cyclone body provided with an inlet through which the drawn-in air is guided to the first, the at least one second, and the plural third cyclone chambers;
    a first cover provided with a discharge passage, and sealing an upper open end of the cyclone body; and
    at least one first passage connecting an outlet of the first cyclone chamber with an inlet of a second cyclone chamber, at least one second passage connecting an outlet of the at least one second cyclone chamber with inlets of associated third cyclone chambers, and at least one third passage guiding air exiting from the associated third cyclone chambers towards the discharge passage.

9. The apparatus of claim 8, further comprising:
    a second cover located between the first cover and the cyclone body, wherein the first, the second, and the third passages are provided between the second cover and the cyclone body, each first passage connecting an outlet of the first cyclone chamber with the inlet of a respective second cyclone chamber, each second passage connecting the outlet of a respective second cyclone chamber with inlets of the associated third cyclone chambers, and each third passage guiding the air exiting from the third cyclone chambers towards the discharge passage.

10. The apparatus of claim 9, wherein the second cover is provided with guide members for guiding air from the first cyclone chamber to the at least one second cyclone chamber; each guide member having a first curved part and a second curved part formed by curving a part of the second cover, each guide member defining a respective first passage when the cyclone body is connected to the second cover, and wherein a respective hollow connecting pipe, which extends towards the upper side of the second cover, connects the outlet of each second cyclone chamber to the associated third cyclone chambers.

11. A vacuum cleaner comprising:
    an air suction port through which dust-carrying air is drawn in from a surface to be cleaned;
    a motor generating a suction force at the air suction port; and a cyclonic dust separating apparatus separating dust from the drawn-in air, the cyclonic dust-separating apparatus comprising a first cyclone chamber separating dust particles from the air by centrifugal force, at least one second cyclone chamber separating dust from air discharged from the first cyclone chamber by centrifugal force, and a plurality of third cyclone chambers separating dust from air discharged from the at least one second cyclone chamber by centrifugal force, wherein the at least one second cyclone chamber has an inner diameter smaller than an inner diameter of the first cyclone chamber and larger than an inner diameter of each third cyclone chamber.

12. The vacuum cleaner of claim 11, wherein the cyclonic dust-separating apparatus comprises a plurality of second cyclone chambers.

13. The vacuum cleaner of claim 11, wherein the third cyclone chambers are substantially identical to each other.

14. The vacuum cleaner of claim 11, wherein the second cyclone chambers are substantially identical to each other.

15. The vacuum cleaner of claim 12, wherein each second cyclone chamber is located between two or more third cyclone chambers.

16. The vacuum cleaner of claim 12, wherein air discharged from one second cyclone chamber is induced into the plurality of third cyclone chambers without mixing with other air discharged from other second cyclone chambers.

17. The vacuum cleaner of claim 16, wherein the air discharged from the one second cyclone chamber is induced into two third cyclone chambers.

18. The vacuum cleaner of claim 12, wherein all discharged air from the second cyclone chambers passes through the plurality of third cyclone chambers.

19. The vacuum cleaner of claim 12, wherein a combined number of the plural third cyclone chambers is greater than a combined number of the plural second cyclone chambers.

20. The vacuum cleaner of claim 11, wherein the plurality of third cyclone chambers are located substantially in a circle.

21. The vacuum cleaner of claim 20, wherein the cyclonic dust-separating apparatus comprises a plurality of second cyclone chambers, and the second cyclone chambers and the third cyclone chambers are located substantially in a circle.

22. The vacuum cleaner of claim 11, wherein the first cyclone chamber and the at least one second cyclone chamber are partially vertically overlapping.

23. The vacuum cleaner of claim 11, wherein the first cyclone chamber and the third cyclone chambers are partially vertically overlapping.

24. The vacuum cleaner of claim 11, wherein the second cyclone chamber and the third cyclone chambers are partially vertically overlapping.

25. The vacuum cleaner of claim 11, wherein the first cyclone chamber, the second cyclone chamber, and the third cyclone chambers are all vertically overlapping with each other.

26. The vacuum cleaner of claim 22, wherein the first, the second, and the third cyclone chambers are formed independently from each other, and the second and the third cyclone chambers are located within the cyclonic dust separating apparatus so as to be disposed in a plane orthogonal to a main axial directional to a main axial direction of the cyclonic dust-separating separating apparatus.

27. The vacuum cleaner of claim 11, wherein the second and the third cyclone chambers are arranged in a substantially circumferential manner.

28. The vacuum cleaner of claim 27, wherein the first cyclone chamber is disposed at a substantially center portion of the circumference formed by the first and the second cyclone chambers.

29. The vacuum cleaner of claim 11, wherein the cyclonic dust-separating apparatus further comprises a dust receptacle.

30. The vacuum cleaner of claim 29, wherein the dust receptacle is provided with a partition dividing the interior of the dust receptacle.

31. The vacuum cleaner of claim 11, wherein the cyclonic dust-separating apparatus further comprises a cyclone body, a dust receptacle detachably connected to a lower part of the cyclone body, and a cover covering an upper part of the cyclone body.

32. The vacuum cleaner of claim 31, wherein the cover comprises a first cover covering an upper end of the cyclone body, and a second cover located between the first cover and the cyclone body.

33. The vacuum cleaner of claim 32, wherein the cyclonic dust-separating apparatus further comprises a gasket installed between the cyclone body and the second cover.

34. The vacuum cleaner of claim 32, wherein the cyclonic dust-separating apparatus further comprises a first passage, a second passage, and a third passage formed by the cyclone body and the second cover.

35. The vacuum cleaner of claim 11, wherein the cyclonic dust-separating apparatus further comprises a grille installed in the first cyclone chamber.

36. A vacuum cleaner comprising:
an air suction port through which dust carrying air is drawn in from a surface to be cleaned;
a motor generating a suction force at the air suction port; and
a cyclonic dust separating apparatus separating dust from the drawn-in air, the cyclonic dust-separating apparatus comprising a first cyclone chamber separating dust particles from the air by centrifugal force, at least one second cyclone chamber separating dust from air discharged from the first cyclone chamber by centrifugal force, and at least one third cyclone chamber separating dust from air discharged from the at least one second cyclone chamber by centrifugal force,
wherein the at least one second cyclone chamber has an inner diameter smaller than an inner diameter of the first cyclone chamber and larger than an inner diameter of each third cyclone chamber, and the first, the second, and third cyclone chambers are independently formed from each other, and are at least partially overlapping each other.

37. The vacuum cleaner of claim 36, further comprising:
a first cover provided with a discharge passage, the first cover covering an upper open end of a cyclone body supporting the cyclonic dust-separating apparatus; and
a second cover, located within the cyclonic dust-separating apparatus, including at least one first passage from the first cyclone chamber to the at least one second cyclone chamber.

38. The vacuum cleaner of claim 36, wherein the first, the second, and the third cyclone chambers are vertically overlapping.

39. The vacuum cleaner of claim 36, wherein all of the drawn-in air passes through the first cyclone chamber, the at least one second cyclone chamber, and the at least one third cyclone chamber.

40. The vacuum cleaner of claim 39, wherein with plural second cyclone chambers or plural third cyclone chambers, all of the drawn-in air passes through the plural second cyclone chambers in parallel and passes through the plural third cyclone chambers in parallel.

41. The vacuum cleaner of claim 39, further comprising a common dust basket collecting the dust from all of the first, the second, and the third cyclone chambers.

42. The vacuum cleaner of claim 39, wherein the first, the second, and the third cyclone chambers separate progressively smaller dust particles.

43. The vacuum cleaner of claim 36, wherein each of the second cyclone chambers is paired with a plurality of third cyclone chambers.

44. The vacuum cleaner of claim 43, wherein the at least one second cyclone chamber is associated with a plurality of third cyclone chambers, with which the second cyclone chamber being in fluid communication, such that all of the air discharged from a respective second cyclone chamber passes through the associated third cyclone chambers.

45. A vacuum cleaner comprising:

an air suction port through which dust carrying air is drawn in from a surface to be cleaned;

a motor generating a suction force at the air suction port; and a cyclonic dust separating apparatus separating dust from the drawn-in air, the cyclonic dust-separating apparatus comprising a first cyclone chamber separating dust particles from the air by centrifugal force, at least one second cyclone chamber separating dust from air discharged from the first cyclone chamber by centrifugal force, and at least one third cyclone chamber separating dust from air discharged from the at least one second cyclone chamber by centrifugal force, wherein the at least one second cyclone chamber has an inner diameter smaller than an inner diameter of the first cyclone chamber and larger than an inner diameter of each third cyclone chamber, and a grille is installed in the first cyclone chamber to prevent large dust particles from passing from the first cyclone chamber to the second cyclone chamber.

* * * * *

UNITED STATES PATENT AND TRADEMARK OFFICE
CERTIFICATE OF CORRECTION

PATENT NO. : 7,462,212 B2
APPLICATION NO. : 11/318177
DATED : December 9, 2008
INVENTOR(S) : Jung-gyun Han et al.

It is certified that error appears in the above-identified patent and that said Letters Patent is hereby corrected as shown below:

Column 8, Line 24, change "claims 1," to --claim 1,--.

Column 8, Line 53, change "chamber;" to --chamber,--.

Signed and Sealed this

Fourteenth Day of April, 2009

JOHN DOLL
*Acting Director of the United States Patent and Trademark Office*